(12) United States Patent
Kanno et al.

(10) Patent No.: US 10,790,530 B2
(45) Date of Patent: *Sep. 29, 2020

(54) CELL FRAME AND REDOX FLOW BATTERY

(71) Applicant: Sumitomo Electric Industries, Ltd., Osaka-shi (JP)

(72) Inventors: Takashi Kanno, Osaka (JP); Katsuya Yamanishi, Osaka (JP); Takefumi Ito, Osaka (JP); Masahiro Kuwabara, Osaka (JP); Kiyoaki Moriuchi, Osaka (JP); Hideyuki Yamaguchi, Osaka (JP); Hayato Fujita, Osaka (JP); Kousuke Shiraki, Osaka (JP); Kiyoaki Hayashi, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/250,682

(22) Filed: Jan. 17, 2019

(65) Prior Publication Data

US 2019/0157699 A1 May 23, 2019
US 2020/0112044 A2 Apr. 9, 2020
US 2020/0259198 A2 Aug. 13, 2020

Related U.S. Application Data

(63) Continuation of application No. 15/501,502, filed as application No. PCT/JP2015/078209 on Oct. 5, 2015, now Pat. No. 10,230,123.

(30) Foreign Application Priority Data

Nov. 6, 2014 (JP) .................................. 2014-226269

(51) Int. Cl.
H01M 8/00 (2016.01)
H01M 8/18 (2006.01)
(Continued)

(52) U.S. Cl.
CPC ............... H01M 8/18 (2013.01); H01M 8/02 (2013.01); H01M 8/0271 (2013.01);
(Continued)

(58) Field of Classification Search
CPC .... H01M 8/0271; H01M 8/0273; H01M 8/02; H01M 8/0284; H01M 8/18; H01M 8/0297; Y02E 60/528
See application file for complete search history.

(56) References Cited

U.S. PATENT DOCUMENTS

2012/0156535 A1 6/2012 Harrer et al.
2013/0309540 A1* 11/2013 Nakaishi ............... H01M 8/188
429/99
2014/0065509 A1 3/2014 Skala

FOREIGN PATENT DOCUMENTS

JP 62-090876 A 4/1987
JP 2001-155758 A 6/2001
(Continued)

OTHER PUBLICATIONS

International Search Report in counterpart International Application No. PCT/JP2015/078209, dated Dec. 28, 2015 [Cited in Parent].
(Continued)

*Primary Examiner* — Cynthia H Kelly
*Assistant Examiner* — Monique M Wills
(74) *Attorney, Agent, or Firm* — Baker Botts L.L.P.; Michael A. Sartori

(57) ABSTRACT

The battery cell for a flow battery includes a cell frame including a frame including a through-window and a manifold serving as an electrolyte flow path, and a bipolar plate
(Continued)

blocking the through-window; a positive electrode disposed on one surface side of the bipolar plate; and a negative electrode disposed on another surface side of the bipolar plate. In this battery cell, in the frame, a thickness of a portion in which the manifold is formed is defined as Ft; in the bipolar plate, a thickness of a portion blocking the through-window is defined as Bt; in the positive electrode, a thickness of a portion facing the bipolar plate is defined as Pt; in the negative electrode, a thickness of a portion facing the bipolar plate is defined as Nt; and these thicknesses satisfy $Ft \geq 4$ mm, $Bt \geq Ft-3.0$ mm, $Pt \leq 1.5$ mm, and $Nt \leq 1.5$ mm.

15 Claims, 10 Drawing Sheets

(51) Int. Cl.
  *H01M 8/0297* (2016.01)
  *H01M 8/0273* (2016.01)
  *H01M 8/0271* (2016.01)
  *H01M 8/02* (2016.01)
  *H01M 8/0284* (2016.01)
(52) U.S. Cl.
  CPC ....... *H01M 8/0273* (2013.01); *H01M 8/0284* (2013.01); *H01M 8/0297* (2013.01); *H01M 8/188* (2013.01); *Y02E 60/528* (2013.01)

(56) References Cited

FOREIGN PATENT DOCUMENTS

| JP | 2008-537290 A | 9/2008 |
| JP | 2012-216510 A | 11/2012 |
| JP | 2014-139905 A | 7/2014 |
| WO | 2011015842 A1 | 2/2011 |

OTHER PUBLICATIONS

Written Opinion of the International Searching Authority in counterpart International Application No. PCT/JP2015/078209, dated Dec. 28, 2015 [Cited in Parent].

* cited by examiner

CELL FRAME AND REDOX FLOW BATTERY

CROSS-REFERENCE TO RELATED APPLICATIONS

This application is a Continuation of U.S. patent application Ser. No. 15/501,502, filed Feb. 3, 2017, which is the U.S. National Stage of International Application No. PCT/JP2015/078209 filed on Oct. 5, 2015, which claims priority to Japanese Patent Application No. 2014-226269 filed in Japan on Nov. 6, 2014.

TECHNICAL FIELD

The present invention relates to a battery cell for a flow battery, and a redox flow battery using the battery cell.

BACKGROUND ART

One of high-capacity storage batteries for storing electricity of new energy from solar photovoltaic power generation and wind power generation is a flow battery, typically a redox flow battery (RF battery). The RF battery is charged or discharged using the oxidation-reduction potential difference between ions contained in a positive electrolyte and ions contained in a negative electrolyte (refer to, for example, Patent Literature 1). As illustrated in FIG. 9 of the principle of the operation of a RF battery α, the RF battery α includes a battery cell 100 divided into a positive electrode cell 102 and a negative electrode cell 103 by a proton-permeable membrane 101. The positive electrode cell 102 contains a positive electrode 104, and is connected via ducts 108 and 110 to a positive electrolyte tank 106, which stores a positive electrolyte. The duct 108 is equipped with a pump 112. These members 106, 108, 110, and 112 constitute a positive circulation line 100P, which circulates the positive electrolyte. Similarly, the negative electrode cell 103 contains a negative electrode 105, and is connected via ducts 109 and 111 to a negative electrolyte tank 107, which stores a negative electrolyte. The duct 109 is equipped with a pump 113. These members 107, 109, 111, and 113 constitute a negative circulation line 100N, which circulates the negative electrolyte. The electrolytes stored in the tanks 106 and 107 are circulated by the pumps 112 and 113 through the cells 102 and 103 during charge and discharge. When charge or discharge is not performed, the pumps 112 and 113 are stopped and the electrolytes are not circulated.

In general, the battery cell 100 is formed within a structure referred to as a battery cell stack 200 in FIG. 10. The battery cell stack 200 is constituted by sandwiching, from both sides, a multilayer structure referred to as a substack 200s with two end plates 210 and 220, and fastening the substack 200s with a fastening mechanism 230 (FIG. 10 illustrates a configuration using plural substacks 200s). As illustrated in the upper part of FIG. 10, the substack 200s has a configuration in which cell units constituted by a cell frame 120, a positive electrode 104, a membrane 101, a negative electrode 105, and a cell frame 120 are stacked, and the stack body is sandwiched between supply/drainage plates 190 and 190 (refer to the lower part of FIG. 10). Such a cell frame 120 in the cell unit includes a frame 122 including a through-window and a bipolar plate 121 blocking the through-window. The positive electrode 104 is disposed on and in contact with one surface side of the bipolar plate 121. The negative electrode 105 is disposed on and in contact with the other surface side of the bipolar plate 121. In this configuration, a single battery cell 100 is formed between bipolar plates 121 of adjacent cell frames 120.

In the substack 200s, supply and drainage of electrolytes through the supply/drainage plates 190 and 190 to and from the battery cells 100 are performed with liquid supply manifolds 123 and 124 and liquid drainage manifolds 125 and 126, which are formed in the frames 122. The positive electrolyte is supplied from the liquid supply manifold 123 through an inlet slit formed in one surface side (exposed side in the drawing) of the frame 122 to the positive electrode 104, and drained through an outlet slit formed in an upper portion of the frame 122 to the liquid drainage manifold 125. Similarly, the negative electrolyte is supplied from the liquid supply manifold 124 through an inlet slit (represented by dotted lines) formed in the other surface side (hidden side in the drawing) of the frame 122 to the negative electrode 105, and drained through an outlet slit (represented by dotted lines) formed in an upper portion of the frame 122 to the liquid drainage manifold 126. Ring-shaped sealing members 127 such as O-rings or flat gaskets are disposed between the cell frames 120 to suppress leakage of electrolytes from the substack 200s.

Input and output of electric power between the external apparatus and the battery cells 100 in the substacks 200s are performed with a current-collecting structure using current collector plates formed of a conductive material. A pair of current collector plates is disposed for each of the substacks 200s; and the current collector plates are individually electrically connected to, among plural cell frames 120 stacked, the bipolar plates 121 of cell frames 120 that are disposed at both ends in the stack direction.

CITATION LIST

Patent Literature

PTL 1: Japanese Unexamined Patent Application Publication No. 2014-139905

SUMMARY OF INVENTION

Technical Problem

In recent years, an increase in the demand for redox flow batteries as units for storing electricity of new energy has been expected, and there has been a demand for a battery cell having high battery performance. For example, it is expected that achievement of a decrease in the internal resistance of a battery cell leads to further enhancement of the battery performance of the battery cell.

The present invention has been made under the above-described circumstances. An object of the present invention is to provide a battery cell having high battery performance.

Solution to Problem

A battery cell according to an embodiment of the present invention is a battery cell for a flow battery, the battery cell including a cell frame including a frame including a through-window and a manifold serving as an electrolyte flow path, and a bipolar plate blocking the through-window; a positive electrode disposed on one surface side of the bipolar plate; and a negative electrode disposed on another surface side of the bipolar plate. In this battery cell, in the frame, a thickness of a portion in which the manifold is formed is defined as Ft; in the bipolar plate, a thickness of a portion blocking the through-window is defined as Bt; in the positive electrode, a thickness of a portion facing the bipolar plate is defined as Pt; in the negative electrode, a thickness of a portion facing the bipolar plate is defined as Nt; and these thicknesses satisfy the following formulae:

$Ft \geq 4$ mm, $Bt \geq Ft - 3.0$ mm, $Pt \leq 1.5$ mm, and $Nt \leq 1.5$ mm.

A redox flow battery according to an embodiment of the present invention includes a cell stack in which plural battery cells described above are stacked; a positive circulation line configured to circulate a positive electrolyte through the cell stack; and a negative circulation line configured to circulate a negative electrolyte through the cell stack.

Advantageous Effects of Invention

The battery cell and the redox flow battery have low internal resistances and have high battery performance.

DESCRIPTION OF EMBODIMENTS

Figure 1:
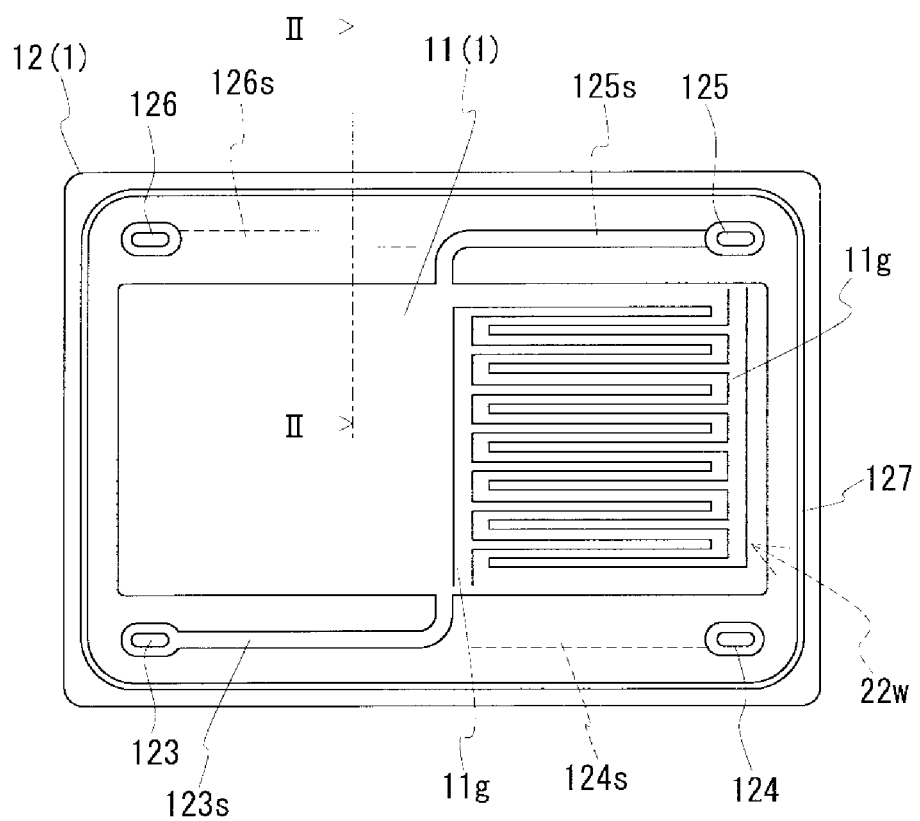
FIG. 1 is a schematic view illustrating the configuration of a cell frame of a battery cell in Embodiment 1.

Description of Embodiments of the Present Invention

Contents of embodiments according to the present invention will be first listed and described.

Through studies on a battery cell having high battery performance, the inventors of the present invention focused on the electric resistance of the electrodes. This is because the inventors have found that, the larger the thicknesses of electrodes disposed in a battery cell, the higher the internal resistance of the battery cell. Accordingly, the inventors examined combinations of the thicknesses of elements (including electrodes) of a battery cell, and have completed battery cells listed below.

<1> A battery cell according to an embodiment is a battery cell for a flow battery, the battery cell including a cell frame including a frame including a through-window and a manifold serving as an electrolyte flow path, and a bipolar plate blocking the through-window; a positive electrode disposed on one surface side of the bipolar plate; and a negative electrode disposed on another surface side of the bipolar plate. In this battery cell, in the frame, a thickness of a portion in which the manifold is formed is defined as Ft; in the bipolar plate, a thickness of a portion blocking the through-window is defined as Bt; in the positive electrode, a thickness of a portion facing the bipolar plate is defined as Pt; in the negative electrode, a thickness of a portion facing the bipolar plate is defined as Nt; and these thicknesses satisfy the following formulae:

$Ft \geq 4$ mm, $Bt \geq Ft - 3.0$ mm, $Pt \leq 1.5$ mm, and $Nt \leq 1.5$ mm.

The battery cell has high battery performance. This is because the electrode thicknesses Pt and Nt are small thicknesses of 1.5 mm or less, which results in suppression of an increase in the internal resistance of the battery cell due to large electrode thicknesses. Conventionally, in general, the bipolar plate has a thickness of about 0.6 mm to about 1 mm, and electrodes disposed on both sides of the thin bipolar plate have a thickness of about 2 mm to about 3 mm. These thicknesses of the bipolar plate and electrodes have been determined in order to decrease the electric resistance of the bipolar plate and to suppress the pressure loss of electrolytes supplied to the electrodes.

<2> The battery cell according to the embodiment may have a configuration in which a flow channel serving as an electrolyte channel is formed on each of the one surface side and the other surface side of the bipolar plate.

Formation of flow channels in the surfaces of the bipolar plate enables electrolytes, supplied through the manifolds of the frame to the bipolar plate, to be rapidly distributed to the whole surfaces of the bipolar plate. As a result, the electrolytes are sufficiently supplied to the whole surfaces of the electrodes disposed on the surfaces of the bipolar plate, which enhances the battery performance of the battery cell. In particular, the thinner the electrodes, the higher the flow resistance against electrolytes in the planar direction of the bipolar plate and the less the electrolytes are distributed to the whole surfaces of the bipolar plate. Accordingly, the thinner the electrodes, the more preferable it is to form flow channels in the bipolar plate.

<3> The battery cell according to the embodiment may have a configuration in which the frame includes, as an inner peripheral recess portion, a peripheral portion surrounding a whole periphery around the through-window and having a smaller thickness than another portion of the frame, and the bipolar plate includes an outer peripheral engagement portion extending along a whole outer periphery of the bipolar plate, having a predetermined width, and engaging with the inner peripheral recess portion.

With this configuration, by simply fitting the bipolar plate into the inner peripheral recess portion of the frame, the bipolar plate can be disposed over the through-window of the frame, and the bipolar plate can also be aligned with respect to the frame. This can increase the productivity of the battery cell.

<4> The battery cell according to the embodiment may have a configuration in which the outer peripheral engagement portion is formed so as to have a smaller thickness than another portion of the bipolar plate.

In the bipolar plate, the outer peripheral engagement portion engaging with the inner peripheral recess portion is formed as a thin portion that is thinner than the other portion of the bipolar plate, so that the bipolar plate fit in the frame can be held with stability.

<5> A redox flow battery according to an embodiment includes a cell stack in which plural battery cells according to the above-described embodiment are stacked; a positive circulation line configured to circulate a positive electrolyte through the cell stack; and a negative circulation line configured to circulate a negative electrolyte through the cell stack.

The redox flow battery has high battery performance. This is because the battery cells in the redox flow battery have higher battery performance than conventional ones.

DETAILS OF EMBODIMENTS OF THE PRESENT INVENTION

Hereinafter, redox flow batteries (RF batteries) according to embodiments will be described. However, the scope of the present invention is not limited to the configurations of the embodiments, but is indicated by Claims. The scope of the present invention is intended to embrace all the modifications within the meaning and range of equivalency of the Claims.

Embodiment 1

Figure 9:
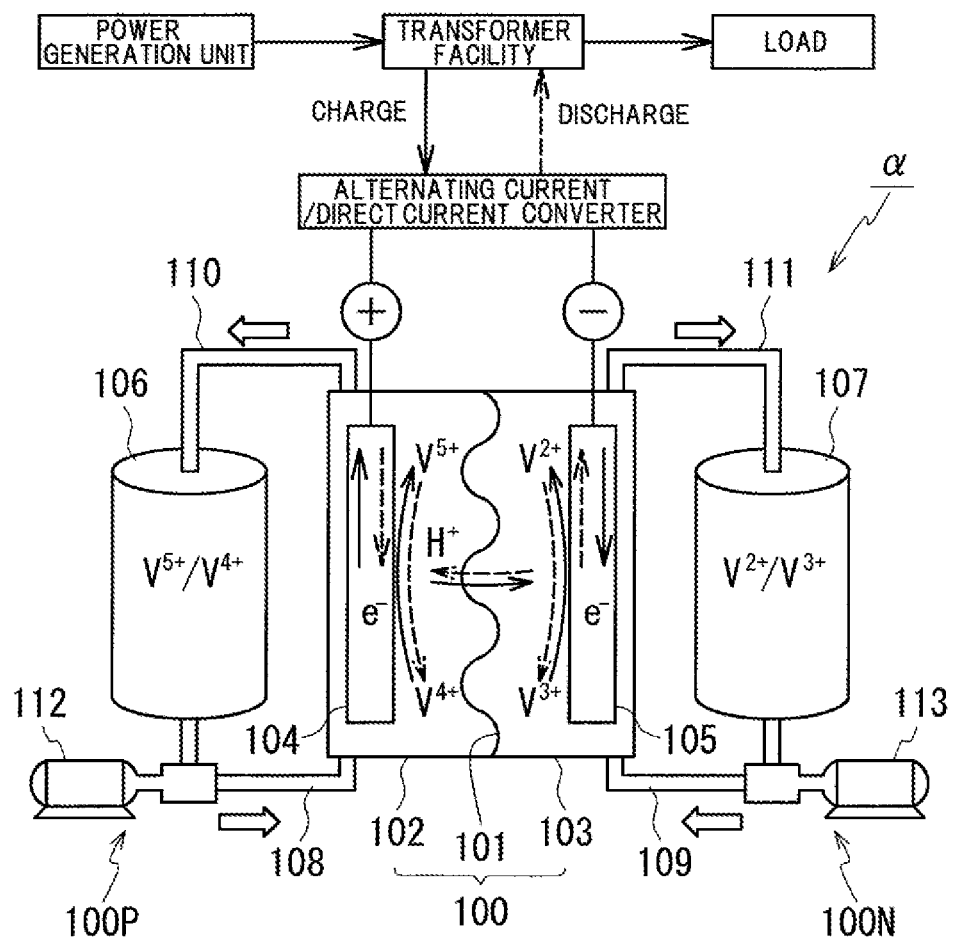
FIG. 9 illustrates the principle of the operation of a redox flow battery.
Figure 10:
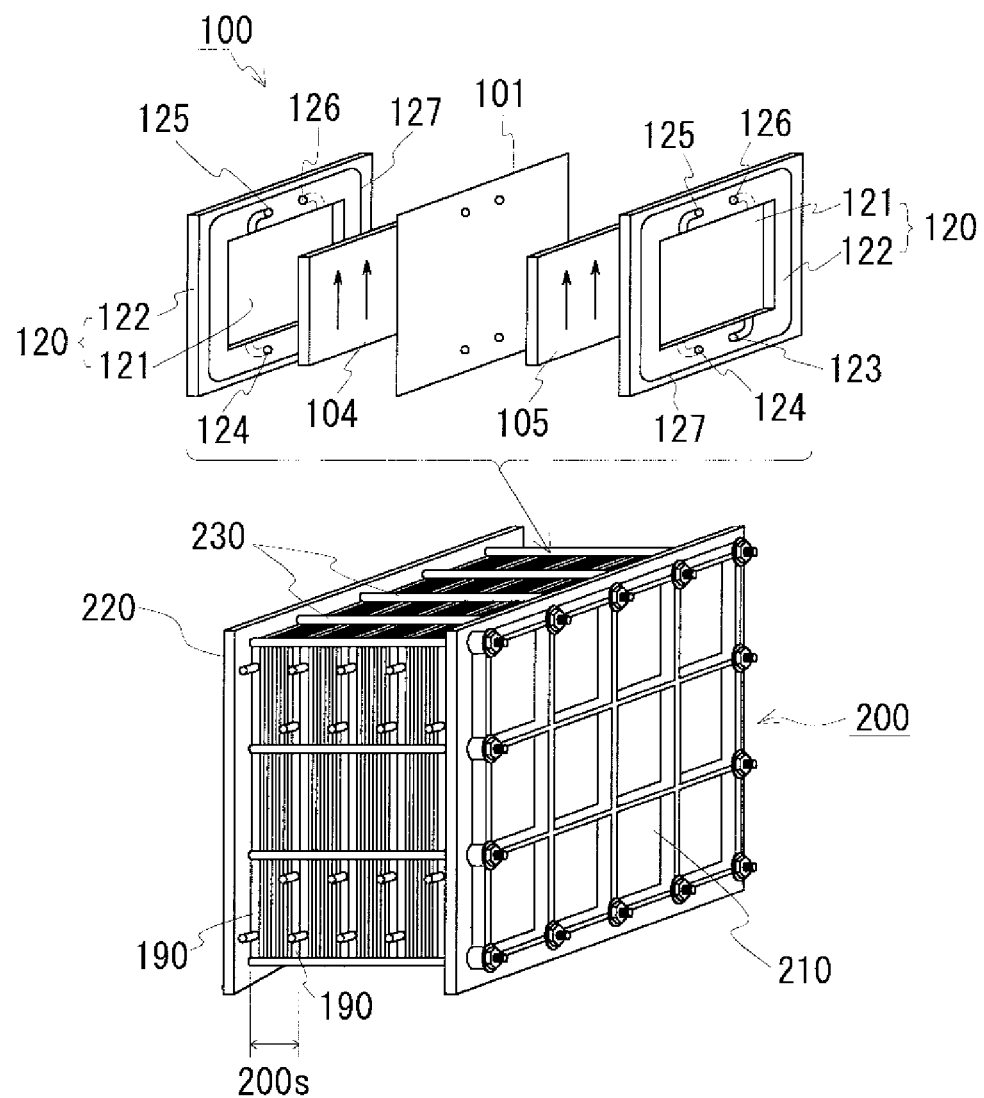
FIG. 10 is a schematic view illustrating the configuration of a battery cell stack.

As with the conventional RF battery α described with reference to FIG. 9, a RF battery according to this embodiment includes a battery cell 100, a positive circulation line 100P, and a negative circulation line 100N. The battery cell 100 of this embodiment is used in the form of the battery cell stack 200 in FIG. 10. As described above, the battery cell stack 200 has a configuration in which plural cell units each including a membrane 101, electrodes 104 and 105, and a pair of cell frames 120 and 120 are stacked. A main difference of the RF battery of this embodiment from the conventional one lies in the thicknesses of the cell frames and the electrodes of such a cell unit. Hereinafter, a cell frame 1 and electrodes 104 and 105 according to this embodiment will be described with reference to FIGS. 1 and 2. Incidentally, in the cell frame 1, the same elements as conventional ones are denoted by the same reference signs as in FIG. 10.

<<Cell Frame>>

As illustrated in FIG. 1, the cell frame 1 includes a frame 12 and a bipolar plate 11. The frame 12 includes a through-window 22w extending through the frame 12 in the thickness direction. The bipolar plate 11 is disposed so as to fill the through-window 22w. The outer periphery of the bipolar plate 11 is embedded within the inner peripheral portion around the through-window 22w of the frame 12.

[Frame]

As illustrated in FIG. 1, the frame 12 is a member that supports the bipolar plate 11 described later. As in the conventional configuration, the frame 12 includes liquid supply manifolds 123 and 124, liquid drainage manifolds 125 and 126, inlet slits 123s and 124s, and outlet slits 125s and 126s. The inlet slit 123s and the outlet slit 125s, which are represented by solid lines, are disposed on the exposed side of the drawing. The inlet slit 124s and the outlet slit 126s, which are represented by dotted lines, are disposed on the hidden side of the drawing. The slits 123s to 126s respectively extend from the manifolds 123 to 126 toward the center line of the frame 12 and are connected to the through-window 22w (the inlet slit 124s and the outlet slit 126s are partially not shown). The manifolds 123 to 126 and the slits 123s to 126s are surrounded by a sealing member 127 such as an O-ring to prevent electrolytes from leaking beyond the sealing member 127 to the outside. Such O-rings are compressed when plural cell frames 1 are stacked and fastened, and provide sealing functions. The sealing member 127 may be a double sealing member. Sealing members (not shown) may be disposed so as to surround the manifolds.

Figure 2:
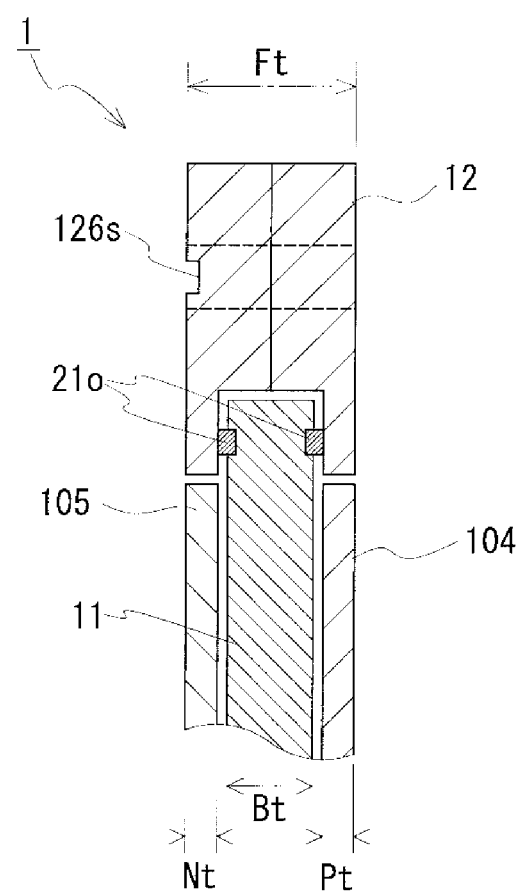
FIG. 2 is a sectional view taken along II-II in FIG. 1.

As illustrated in the partial sectional view of FIG. 2, the frame 12 of this example is formed by bonding together two frame-shaped plate members, which provides a sectional shape having symmetry with respect to the left and the right. The frame-shaped plate members have, on their through-window sides (lower sides in the drawing), thin portions. The two frame-shaped plate members are bonded together to form, between the thin portions of the frame-shaped plate members, a space for housing the outer peripheral portion of the bipolar plate 11.

The material for the frame 12 preferably has a highly insulating property, more preferably further has acid resistance. Examples of the material for the frame 12 include vinyl chloride, chlorinated polyethylene, and chlorinated paraffin.

[Bipolar Plate]

As illustrated in the sectional view of FIG. 2, the bipolar plate 11 has one surface side in contact with the positive electrode 104, and the other surface side in contact with the negative electrode 105. The bipolar plate 11 of this example is a plate member substantially having a constant thickness. Among stacked bipolar plates 11, the bipolar plates 11 that are disposed at ends are in contact with and electrically connected to current collector plates.

As illustrated in FIG. 1, the one surface side and the other surface side of the bipolar plate 11 of this embodiment have interdigitated flow channels 11g and 11g for distributing electrolytes supplied via the inlet slits 123s and 124s to the whole surfaces of the bipolar plate 11. These two flow channels 11g and 11g are disposed so as to have an interdigitated comb-teeth configuration. The drawing shows the flow channels 11g and 11g only on the right side of the bipolar plate 11; actually, another pair of flow channels is formed on the left side of the bipolar plate 11. The flow channels on the left side are disposed so as to have line symmetry together with the flow channels 11g and 11g shown in the drawing as if these flow channels 11g and 11g were shifted beyond the center line of the bipolar plate 11. The interdigitated flow channels 11g and 11g enable rapid distribution of the electrolytes, supplied via the inlet slits 123s (124s) to the bipolar plate 11, over the whole surfaces of the bipolar plate 11. Thus, in FIG. 2, the electrolytes can be distributed over the whole surfaces of the positive electrode 104 and the negative electrode 105 disposed on the one surface side and the other surface side of the bipolar plate 11. Accordingly, even when the electrodes 104 and 105 are formed with reduced thicknesses, the battery performance of the battery cell is not degraded.

Incidentally, the shape of the flow channels 11g is not limited to the comb-teeth shape illustrated, and may be any shape as long as electrolytes can be distributed over the whole surfaces of the bipolar plate 11. For example, the flow channels may have a dendritic shape.

As illustrated in FIG. 2, the outer peripheral portion of the bipolar plate 11 is sandwiched between the two frame-shaped plate members constituting the frame 12. This sandwiching fixes the bipolar plate 11 so as to be joined to the frame 12. The outer peripheral portion of the bipolar plate 11 has grooves, and O-rings 21o are disposed in the grooves. This sealing structure suppresses flow of electrolytes between the one surface side and the other surface side of the bipolar plate 11.

The material for the bipolar plate 11 preferably has high electrical conductivity, more preferably further has acid resistance and flexibility. For example, the material is a conductive material containing a carbonaceous material. Specifically, the material may be a conductive plastic composed of graphite and a chlorinated organic compound, or may be such a conductive plastic in which the graphite is partially substituted with at least one of carbon black and diamond-like carbon. Examples of the chlorinated organic compound include vinyl chloride, chlorinated polyethylene, and chlorinated paraffin. Such a material is used to constitute the bipolar plate 11, to thereby provide the bipolar plate 11 that has low electric resistance, and has high acid resistance and high flexibility.

<<Electrodes>>

As illustrated in the partial sectional view of FIG. 2, the positive electrode 104 and the negative electrode 105 are respectively disposed on the one surface side (the right side of the drawing) and the other surface side (the left side of the drawing) of the bipolar plate 11. The electrodes 104 and 105 are both porous bodies having deformation properties, and are compressed between the stacked cell frames 1. The drawing is illustrated as if there were gaps between the electrodes 104 and 105 and their adjacent members; actually, no such gaps are formed due to the deformation properties of the electrodes 104 and 105.

The material for the electrodes 104 and 105 preferably has high electrical conductivity, more preferably further has acid resistance. For example, woven fabric or non-woven fabric formed of carbonaceous fibers may be used to constitute the electrodes 104 and 105. Alternatively, for example, carbon paper sheets may be used as the electrodes 104 and 105.

<<Thicknesses of Frame, Bipolar Plate, and Electrodes>>

The cell frame 1 and the electrodes 104 and 105 are formed such that, in the frame 12, the thickness of a portion in which a manifold (represented by dotted lines in the drawing) is formed is defined as Ft; in the bipolar plate 11, the thickness of a portion blocking the through-window is defined as Bt; in the positive electrode 104, the thickness of a portion facing the bipolar plate 11 is defined as Pt; in the negative electrode 105, the thickness of a portion facing the bipolar plate 11 is defined as Nt; and these thicknesses satisfy the following formulae:

$Ft \geq 4$ mm, $Bt \geq Ft - 3.0$ mm, $Pt \leq 1.5$ mm, and $Nt \leq 1.5$ mm.

The frame 12 is formed with the thickness Ft of 4 mm or more. As illustrated in FIG. 1, the manifolds 123 to 126, the slits 123s to 126s, and the like are formed in the frame 12. Accordingly, the frame 12 needs to have a relatively large thickness to thereby maintain the strength of the frame 12. When Ft is excessively large, the part that does not contribute to charge or discharge has an excessively large thickness, which results in a decrease in the charge-discharge capacity per volume of the battery cell. For this reason, the upper limit value of Ft is set to 8 mm. Considering the balance between strength and charge-discharge capacity, Ft is preferably 4 mm or more and 6 mm or less.

The bipolar plate 11 is formed with the thickness Bt, which is equal to or more than Ft−3.0 mm. Since Ft≈Bt+Pt+Nt, the larger the thickness Bt, the smaller the thickness Pt of the positive electrode 104 and the thickness Nt of the negative electrode 105. Bt may be equal to or more than Ft−1.0 mm. When the thickness Bt is excessively large, the electrodes 104 and 105 become excessively thin. For this reason, the upper limit value of Bt is preferably Ft−0.5 mm.

The thickness Pt of the positive electrode 104 and the thickness Nt of the negative electrode 105 are set to 1.5 mm or less. By forming the electrodes 104 and 105 as thin electrodes, an increase in the internal resistance of the battery cell can be effectively suppressed. This effect becomes stronger as the thicknesses of the electrodes 104 and 105 are decreased. For this reason, Pt and Nt are preferably set to 1.0 mm or less, more preferably 0.60 mm or less, still more preferably 0.30 mm or less. On the other hand, the lower limit values of Pt and Nt are preferably set to 0.25 mm in view of handleability of the electrodes 104 and 105. Incidentally, Pt and Nt are not necessarily the same value.

Advantages

The configuration having been described so far can provide a battery cell having higher battery performance than conventional ones. This is because the electrodes 104 and 105 of the battery cell have small thicknesses, which enables suppression of an increase in the internal resistance of the battery cell due to the electrodes 104 and 105.

Embodiment 2

Figure 3:
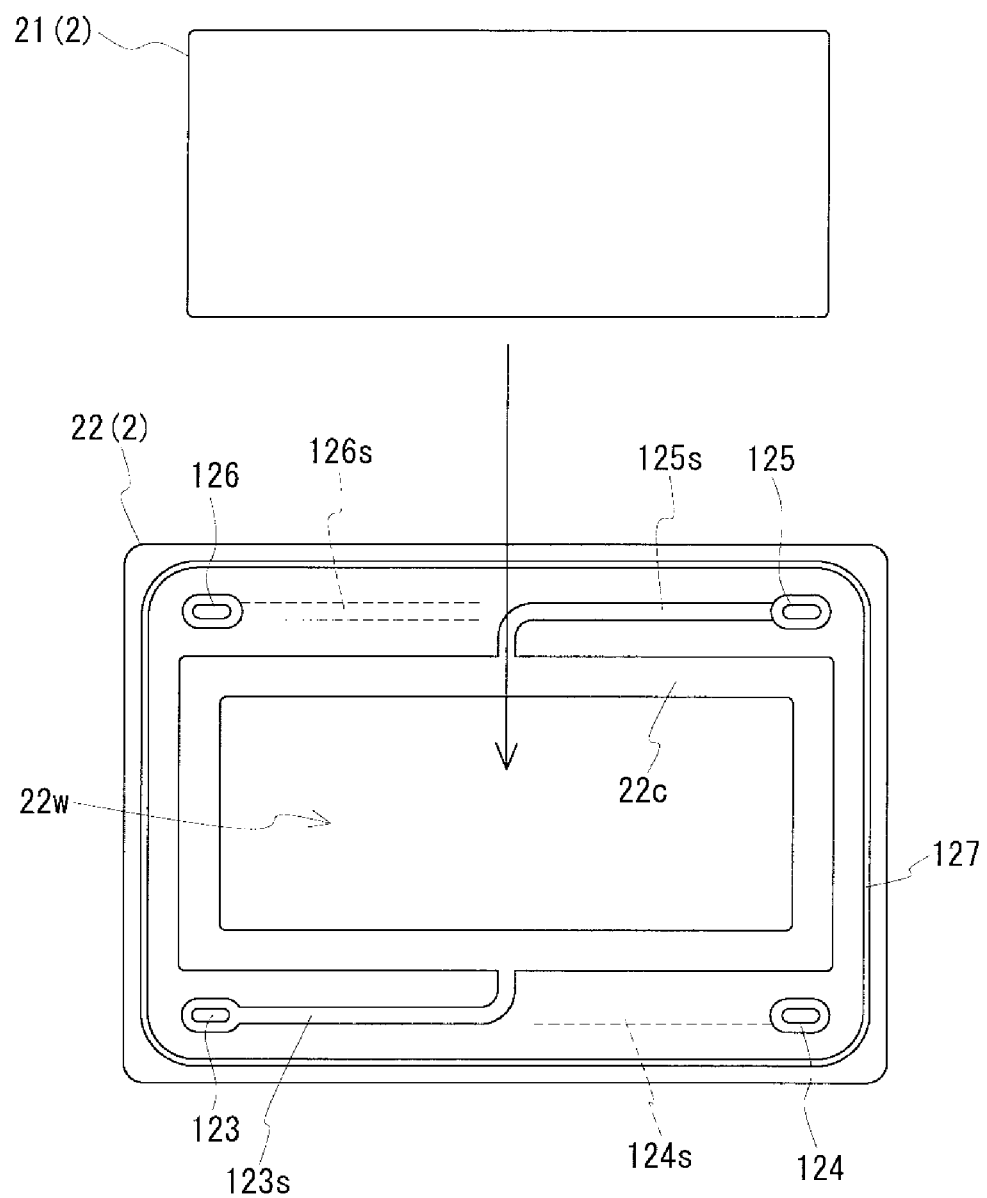
FIG. 3 is a schematic view illustrating the configurations of a frame and a bipolar plate of a cell frame of a battery cell in Embodiment 2.
Figure 4:
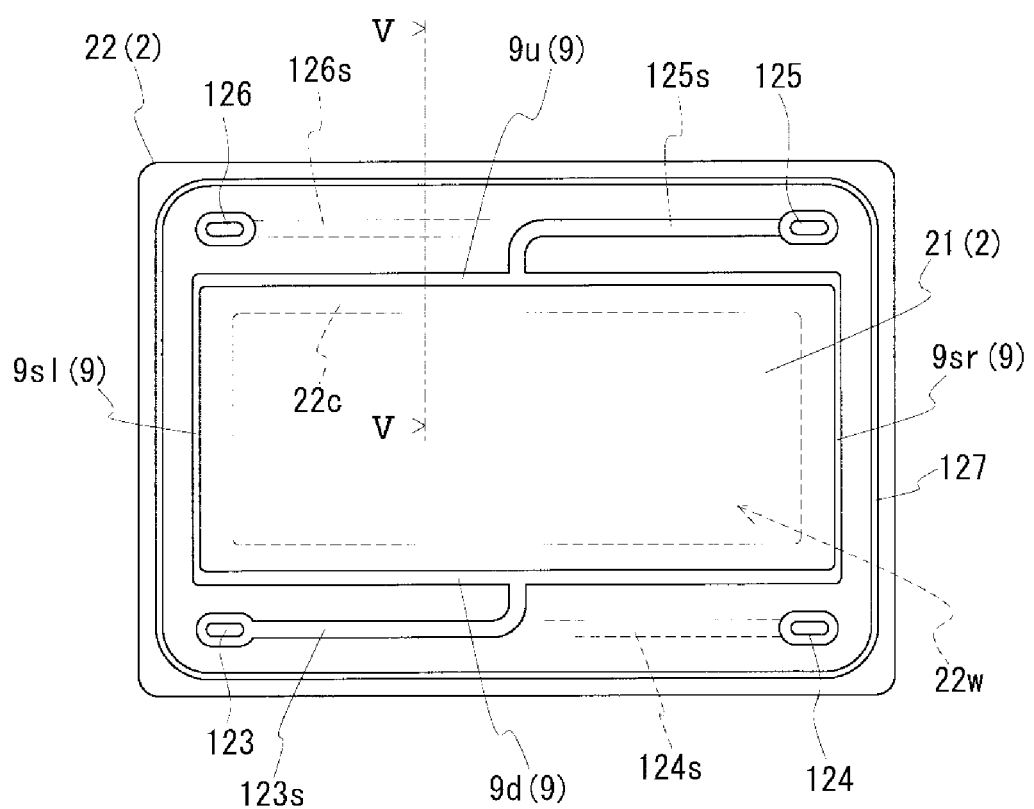
FIG. 4 is a schematic view illustrating the configuration of a cell frame that is an assembly composed of the frame and the bipolar plate in FIG. 3.
Figure 5:
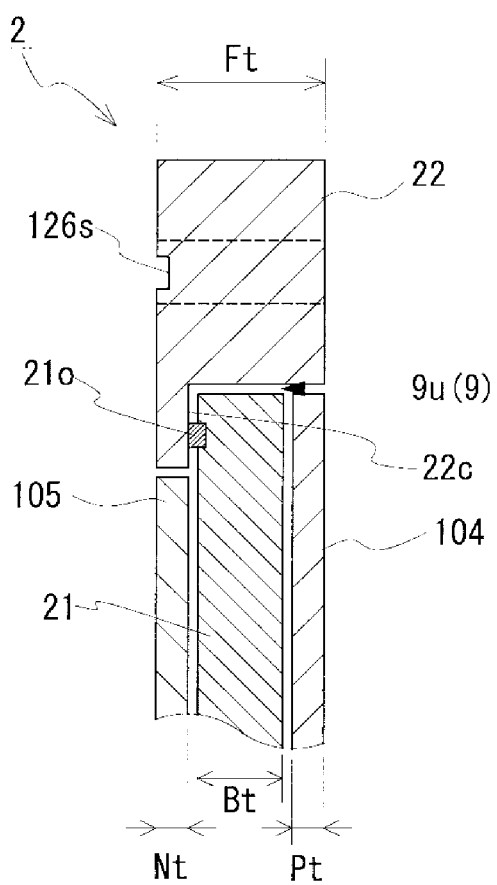
FIG. 5 is a sectional view taken along V-V in FIG. 4.

Embodiment 2 will be described with reference to FIGS. 3 to 5 in terms of an embodiment including a cell frame 2 having a configuration different from that in Embodiment 1. FIG. 3 is a schematic view of a frame 22 and a bipolar plate 21 that constitute the cell frame 2. FIG. 4 is a schematic view of the cell frame 2 in which the bipolar plate 21 is attached to the frame 22. FIG. 5 is a sectional view taken along V-V in FIG. 4. In these drawings, flow channels formed in the surfaces of the bipolar plate 21 are not shown.

The difference of the cell frame 2 from Embodiment 1 lies in employment of a structure in which a peripheral portion, around the through-window 22w, of the frame 22 engages with the outer periphery of the bipolar plate 21, that is, employment of an inset structure in which the bipolar plate 21 is fit into the frame 22. Accordingly, the inset structure and the configuration associated therewith will be mainly described below. Obviously, even in the case of employing the inset structure, the thickness Ft of the frame 22, the thickness Bt of the bipolar plate 21, the thickness Pt of the positive electrode 104, and the thickness Nt of the negative electrode 105 are selected so as to satisfy the values having been described in the embodiment, to suppress an increase in the internal resistance of the battery cell.

[Inset Structure]

The inset structure is constituted in the following manner: the dimensions of the cell frame 2 are adjusted such that, in the cell frame 2 viewed from its front side, the outer peripheral portion (along the whole periphery) of the bipolar plate 21, which is disposed so as to block the through-window 22w of the frame 22, overlaps the frame 22; and a portion of the frame 22, the portion being overlapped by the bipolar plate 21, is formed as a recessed portion. In this example, a peripheral portion of the frame 22, the peripheral portion extending along the whole periphery around the through-window 22w, is thinner than the other portion of the frame 22; and this thin portion forms an inner peripheral recess portion 22c into which the bipolar plate 21 is fit. The inner peripheral recess portion 22c in this example is formed only on one surface side of the frame 22. In other words, the backside surface of the inner peripheral recess portion 22c flatly extends to a portion outside the backside surface (refer to FIG. 5).

The bipolar plate 21 is fit into the inner peripheral recess portion 22c, so that, as illustrated in FIG. 4, the inner peripheral recess portion 22c engages with, in the thickness direction of the frame 22, the outer peripheral engagement portion (extending over the whole outer periphery and having a predetermined width) of the bipolar plate 21 (refer also to FIG. 5). As a result, the through-window 22w of the frame 22 is blocked with the bipolar plate 21. As illustrated in FIG. 5, in this case of employing the inset structure, in order to prevent flow of electrolytes between one surface side and the other surface side of the bipolar plate 21, sealing needs to be provided between the frame 22 and the bipolar plate 21. In this example, a ring-shaped groove is formed in a portion of the bipolar plate 21, the portion overlapping the inner peripheral recess portion 22c, and an O-ring 21o is disposed in the groove to thereby form a sealing structure. Such O-rings 21o are compressed when plural cell frames 2 are stacked and fastened, and provide sealing functions. Alternatively, such a sealing structure may be formed with a flat gasket, or by thermal fusion, or by coating the inner peripheral recess portion 22c with an adhesive and bonding together the inner peripheral recess portion 22c and the bipolar plate 21.

As illustrated in FIG. 4, in the case of employing the inset structure, by simply fitting the bipolar plate 21 into the inner peripheral recess portion 22c of the frame 22, the bipolar plate 21 can be disposed over the through-window 22w of the frame 22. In addition, by fitting the bipolar plate 21 into the inner peripheral recess portion 22c, the bipolar plate 21 can be aligned with respect to the frame 22. This enables an increase in the productivity of the cell frame 2.

In the case of employing the inset structure, in the presence of tolerance during production, it is difficult to make the outer size of the inner peripheral recess portion 22c be equal to the outer size of the bipolar plate 21; and if these outer sizes are made to be equal to each other, it becomes difficult to fit the bipolar plate 21 into the frame 22, which is problematic. Accordingly, the outer size of the inner peripheral recess portion 22c is made slightly larger (by, for example, about 1 mm to about 1.5 mm) than the outer size of the bipolar plate 21, to facilitate fitting of the bipolar plate 21 into the frame 22. However, in this case, a leakage channel 9 of the electrolyte is formed in the cell frame 2 viewed from its front side, the leakage channel 9 being formed between the frame 22 and the bipolar plate 21, the leakage channel 9 extending from the inlet slit 123s to the outlet slit 125s. The leakage channel 9 is a gap between the members and has a very low flow resistance. Thus, the electrolyte introduced through the inlet slit 123s to the bipolar plate 21 tends to flow into the leakage channel 9. The electrolyte flowing into the leakage channel 9 substantially does not come into contact with the positive electrode on the bipolar plate 21, and is drained through the outlet slit 125s. Accordingly, the larger the amount of the electrolyte flowing in the leakage channel 9, the lower the charge-discharge efficiency of the battery cell. For this reason, the following dividing structure (not shown) that divides the leakage channel 9 is preferably provided.

[Dividing Structure]

As illustrated in FIG. 4, the leakage channel 9 is constituted by a first horizontal channel 9d disposed in a lower portion of the cell frame 2 and connected to the inlet slit 123s, a second horizontal channel 9u disposed in an upper portion of the cell frame 2 and connected to the outlet slit 125s, and two vertical channels 9sr and 9sl that connect together the two horizontal channels 9d and 9u. Dividing structures that divide the leakage channel 9 are broadly grouped into the following three configurations:

(1) a configuration in which a dividing member is stuffed into the leakage channel 9 to divide the leakage channel 9;

(2) a configuration in which the bipolar plate 21 has a portion protruding toward the frame 22 and the protruding portion divides the leakage channel 9; and (3) a configuration in which the frame 22 has a portion protruding toward the bipolar plate 21 and the protruding portion divides the leakage channel 9.

Among these three configurations, in particular, (1) the dividing member will be described. The dividing member is preferably constituted by an elastic member that has deformation properties and can be pressed into the leakage channel 9. For example, a long rubber member may be used as the dividing member. In the leakage channel 9, the position where the dividing member is disposed is not particularly limited. For example, such dividing members may be fit into lower portions of the vertical channels 9sr and 9sl (closer to the first horizontal channel 9d). In this case, the electrolyte introduced into the first horizontal channel 9d rapidly spreads through the first horizontal channel 9d, which results in uniform distribution in the width direction of the bipolar plate 21 (in the left-right direction in the drawing). Subsequently, the electrolyte flowing through the vertical channel 9sr (9sl) hits against the dividing member and flows in the center direction (toward the electrode) of the bipolar plate 21. As a result, the electrolyte comes into contact with the electrode disposed on the surface of the bipolar plate 21, to contribute to charge or discharge.

Embodiment 3

Embodiment 3 will be described with reference to FIGS. 6 to 8 in terms of a cell frame 3 having an inset structure slightly different from that of Embodiment 2. Main differences of the cell frame 3 of Embodiment 3 from Embodiment 2 are that a portion of a bipolar plate 31, the portion engaging with an inner peripheral recess portion 32c of a frame 32 and having a predetermined width, is formed so as to be thinner than the other portion of the bipolar plate 31; and the leakage channel 9 is formed so as to partially meander. Hereinafter, the differences from Embodiment 2 will be mainly described. Obviously, also in this embodiment, the thickness Ft of the frame 32, the thickness Bt of the bipolar plate 31, the thickness Pt of the positive electrode 104, and the thickness Nt of the negative electrode 105 are selected so as to satisfy the values having been described in the embodiment, to suppress an increase in the internal resistance of the battery cell.

Figure 6:
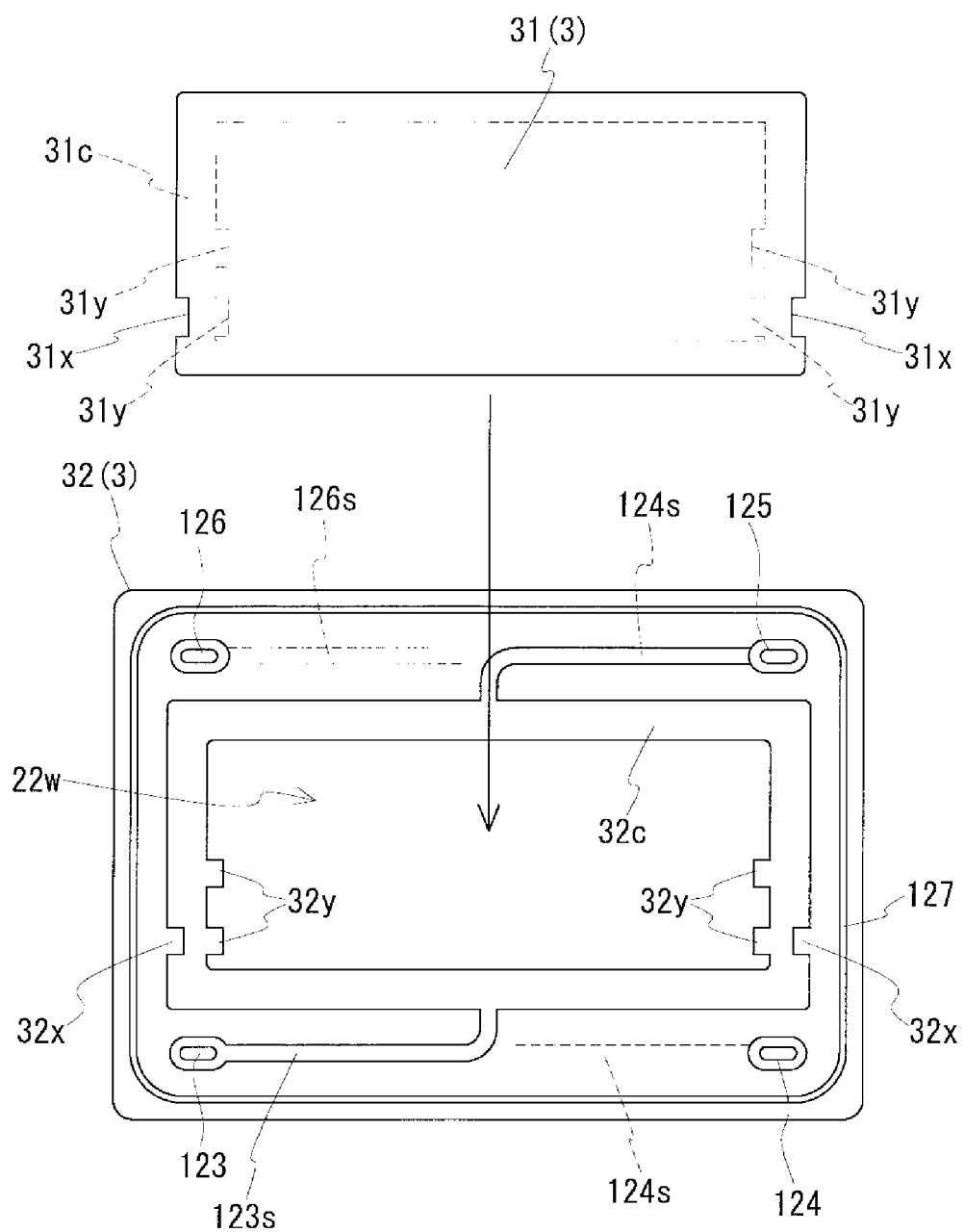
FIG. 6 is a schematic view illustrating the configurations of a frame and a bipolar plate of a cell frame of a battery cell in Embodiment 3.

FIG. 6 is a schematic view of the frame 32 and the bipolar plate 31 in Embodiment 3. These frame 32 and bipolar plate 31 have configurations for making the leakage channel 9 meander. As a configuration for making the leakage channel 9 meander, the frame 32 of this embodiment includes first protrusions 32x, which protrude toward the inner peripheral recess portion 32c. The frame 32 further includes second protrusions 32y, which protrude from the inner peripheral recess portion 32c toward the through-window 22w.

On the other hand, the bipolar plate 31 of this embodiment includes, as a configuration for making the leakage channel 9 meander, first recesses 31x formed by cutting away portions that correspond to the first protrusions 32x of the frame 32. In the back surface side of the bipolar plate 31, the outer peripheral engagement portion (portion outside a portion represented by a dotted line), which engages with the inner peripheral recess portion 32c of the frame 32, is a thin portion 31c formed so as to be thinner than the other portion of the bipolar plate 31. A surface (on the exposed side in the drawing) of the thin portion 31c is flush with the other portion. Thus, a surface (on the hidden side in the drawing) of the thin portion 31c is recessed, with respect to the other portion, toward the exposed side in the drawing. Portions of the thin portion 31c that correspond to the second protrusions 32y of the frame 32 include second recesses 31y, which are formed so as to extend toward the center line of the bipolar plate 31.

Figure 7:
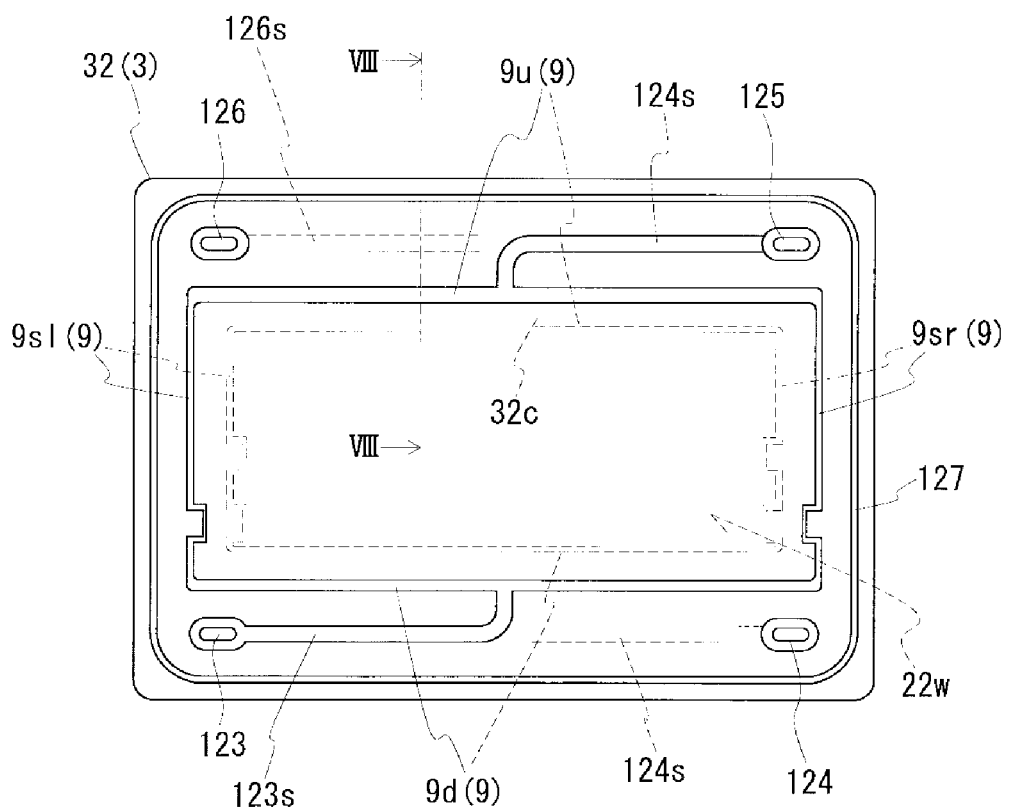
FIG. 7 is a schematic view illustrating the configuration of a cell frame that is an assembly composed of the frame and the bipolar plate in FIG. 6.
Figure 8:
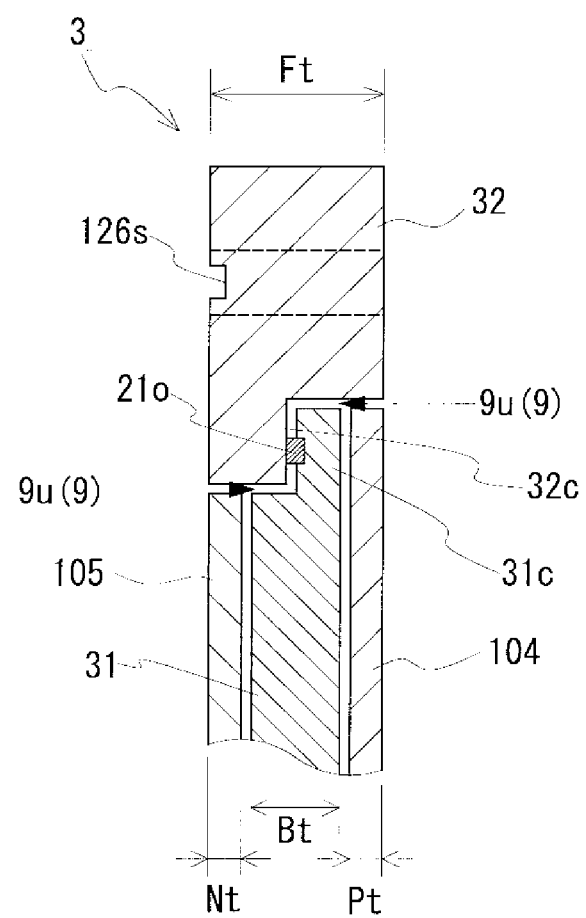
FIG. 8 is a sectional view taken along VIII-VIII in FIG. 7.

As illustrated in FIGS. 7 and 8, when the bipolar plate 31 having the above-described configuration is fit into the frame 32, a leakage channel 9 is formed on one surface side (on the exposed side in FIG. 7, on the right side in FIG. 8) of the cell frame 3, and another leakage channel 9 is formed on the other surface side (on the hidden side in FIG. 7, on the left side in FIG. 8). These two leakage channels 9 are divided with dividing members (not shown).

In the configuration of Embodiment 3 having been described so far, as illustrated in FIG. 8, a portion of the bipolar plate 31 other than the thin portion 31c is fit into the through-window of the frame 32, so that the bipolar plate 31 engages with the frame 32 with more stability than in Embodiment 2.

INDUSTRIAL APPLICABILITY

A battery cell according to the present invention is suitably applicable to formation of flow-type storage batteries such as RF batteries. A RF battery according to the present invention is usable as, in new-energy power generation such as solar photovoltaic power generation and wind power generation, storage batteries used for purposes such as stabilization of variations in output of generated power, storage of surplus power of generated power, and load leveling, and is also usable as high-capacity storage batteries that are placed adjacent to ordinary power plants and used for purposes of addressing voltage sag and power failure and achieving load leveling.

REFERENCE SIGNS LIST

α redox flow battery (RF battery)
1, 2, and 3 cell frames
   11, 21, and 31 bipolar plates
      11g flow channel; 31c thin portion (outer peripheral engagement portion); 21o O-ring
      31x first recess; 31y second recess
   12, 22, and 32 frames
      32c inner peripheral recess portion; 22w through-window
      22x and 32x first protrusions; 32y second protrusion
9 leakage channel
   9d first horizontal channel; 9u second horizontal channel
   9sr and 9sl vertical channels
100 battery cell; 101 membrane; 102 positive electrode cell; 103 negative electrode cell
   100P positive circulation line; 100N negative circulation line
   104 positive electrode; 105 negative electrode; 106 positive electrolyte tank
   107 negative electrolyte tank; 108, 109, 110, and 111 ducts
   112 and 113 pumps
120 cell frame; 121 bipolar plate; 122 frame
   123 and 124 liquid supply manifolds
   125 and 126 liquid drainage manifolds
   123s and 124s inlet slits; 125s and 126s outlet slits
   127 sealing member
   190 supply/drainage plate; 210 and 220 end plates
200 battery cell stack; 200s substack
   230 fastening mechanism

The invention claimed is:

1. A cell frame for a flow battery comprising:
a frame including a through-window and a manifold configured to flow electrolyte through the flow battery, a portion of the frame in which the manifold is formed having a first side and a second side opposite to the first side, and
a bipolar plate blocking the through-window, the bipolar plate having a first side corresponding to the first side of the frame, and a second side opposite the first side of the bipolar plate and corresponding to the second side of the frame,
wherein a flow channel serving as an electrolyte channel is formed on each of the first side and the second side of the bipolar plate;
wherein a thickness of the portion of the frame in which the manifold is formed is greater than or equal to 4 mm;
wherein a thickness of a portion of the bipolar plate blocking the through-window is greater than or equal to the thickness of the portion of the frame through which the manifold is formed minus 3.0 mm;
wherein a distance from the first side of the portion of the frame to the first side of the bipolar plate is less than or equal to 1.5 mm; and
wherein a distance from the second side of the portion of the frame to the second side of the bipolar plate is less than or equal to 1.5 mm.

2. The cell frame according to claim 1, wherein the thickness of the portion of the frame in which the manifold is formed is equal to or less than 8 mm.

3. The cell frame according to claim 1, wherein the thickness of the portion of the bipolar plate blocking the through-window is equal to or less than the thickness of the portion of the frame through which the manifold is formed minus 0.5 mm.

4. The cell frame according to claim 1, wherein the frame includes, as an inner peripheral recess portion, a peripheral portion surrounding a whole periphery around the through-window and having a smaller thickness than another portion of the frame, and
the bipolar plate includes an outer peripheral engagement portion extending along a whole outer periphery of the bipolar plate, having a predetermined width, and engaging with the inner peripheral recess portion.

5. The cell frame according to claim 4, wherein the inner peripheral recess portion is formed only on one surface side of the frame.

6. The cell frame according to claim 5, wherein an outer size of the inner peripheral recess portion is slightly larger than an outer size of the bipolar plate to form a leakage channel between the frame and the bipolar plate.

7. The cell frame according to claim 6, further comprising a dividing structure configured to divide the leakage channel.

8. The cell frame according to claim 7, wherein the dividing structure has a configuration in which a dividing member is stuffed into the leakage channel.

9. The cell frame according to claim 7, wherein the dividing structure has a configuration in which the bipolar plate has a portion protruding toward the frame.

10. The cell frame according to claim 7, wherein the dividing structure has a configuration in which the frame has a portion protruding toward the bipolar plate.

11. The cell frame according to claim 4, wherein the outer peripheral engagement portion is formed so as to have a smaller thickness than another portion of the bipolar plate.

12. The cell frame according to claim 11, wherein the frame further includes a plurality of first protrusions which protrude toward the inner peripheral recess portion and a plurality of second protrusions which protrude from the inner peripheral recess portion toward the through-window;

the bipolar plate further includes a plurality of first recesses formed by cutting away portions of the bipolar plate that correspond to the first protrusions of the frame; and the outer peripheral engagement portion includes a plurality of second recesses that correspond to the plurality of the second protrusions of the frame and which are formed so as to extend toward a center line of the bipolar plate.

13. The cell frame according to claim 1, wherein the frame is formed of a material selected from the group consisting of vinyl chloride, chlorinated polyethylene, and chlorinated paraffin.

14. The cell frame according to claim 1, wherein the bipolar plate is formed of a conductive plastic composed of graphite and a chlorinated organic compound selected from the group consisting of vinyl chloride, chlorinated polyethylene, and chlorinated paraffin.

15. A redox flow battery comprising:

a cell stack in which a plurality of battery cells including a positive electrode, a negative electrode and a plurality of the cell frame according to claim 1 are stacked;

a positive circulation line configured to circulate a positive electrolyte through the cell stack; and a negative circulation line configured to circulate a negative electrolyte through the cell stack.

* * * * *